Figures 1, 2:
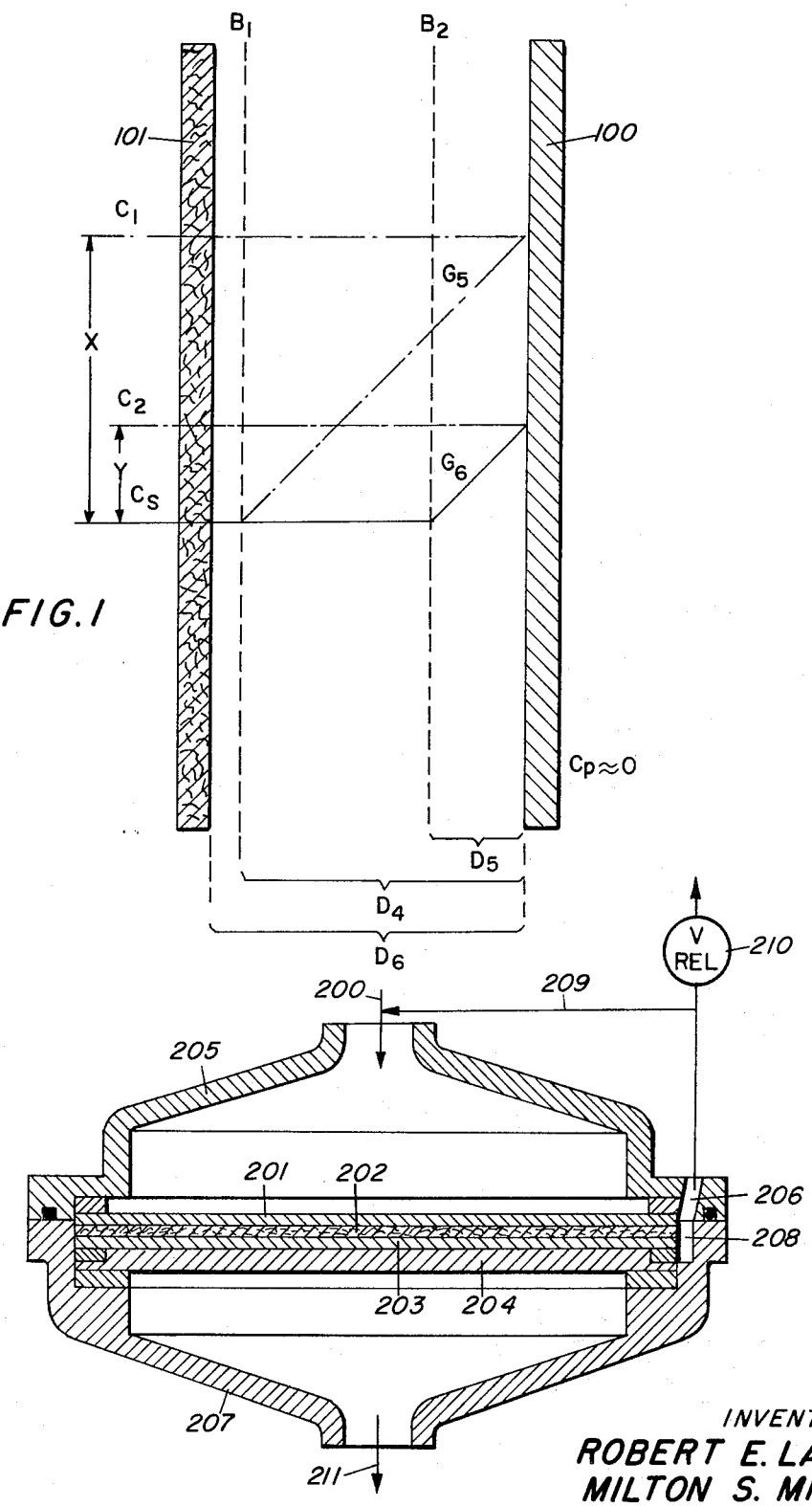

United States Patent
Lacey et al.

[15] 3,676,335
[45] July 11, 1972

[54] PROCESS FOR EFFECTING CHANGES IN SOLUTION CONCENTRATIONS

[72] Inventors: Robert E. Lacey, Homewood, Ala.; Milton S. Mintz, McLean, Va.

[73] Assignees: Southern Research Institute; The United States of America as represented by the Secretary of Interior, ; part interest to each

[22] Filed: Dec. 9, 1970

[21] Appl. No.: 96,406

Related U.S. Application Data

[62] Division of Ser. No. 645,571, June 8, 1967, Pat. No. 3,577,331.

[52] U.S. Cl.............................................................210/23
[51] Int. Cl.........................................................B01d 13/00
[58] Field of Search......................210/22, 23, 321, 488, 492; 204/301, 180 P; 55/16, 158

[56] References Cited

UNITED STATES PATENTS

| | | | |
|---|---|---|---|
| 3,462,362 | 8/1969 | Kollsman | 210/23 |
| 3,450,631 | 7/1969 | Bloch et al. | 210/500 X |
| 3,577,331 | 5/1971 | Lacey et al. | 204/180 |
| 2,848,403 | 8/1958 | Rosenberg | 210/22 X |
| 3,170,867 | 2/1965 | Loeb et al. | 210/22 |
| 3,060,119 | 10/1962 | Carpenter | 210/321 X |
| 3,472,002 | 5/1969 | Geary et al. | 210/321 X |
| 3,355,382 | 11/1967 | Huntington | 210/22 |
| 2,720,980 | 10/1955 | Thomas | 210/22 X |
| 2,712,386 | 7/1955 | Jones et al. | 210/22 X |
| 3,211,645 | 10/1965 | Fevrani | 210/22 |
| 3,271,292 | 9/1966 | Kollsman | 204/296 X |
| 3,275,575 | 9/1966 | Fogle | 204/296 X |

OTHER PUBLICATIONS

1964 Saline Water Conversion Report, Publ. 1965, pp. 107, 108

Sherwood et al., Research on Saline Water Conversion by Freezing and Reverse Osmosis, May 1966, pp. 28–46

*Primary Examiner*—Reuben Friedman
*Assistant Examiner*—Richard Barnes
*Attorney*—Ernest S. Cohen and Roland H. Shubert

[57] ABSTRACT

Efficiency of reverse osmosis separation processes is enhanced by reducing the thickness of the boundary layer formed at the membrane-solution interface. This is accomplished by placing a second membrane, which is substantially permeable to the solution, in a close-spaced relationship to the reverse osmosis membrane. A portion of the solution is withdrawn from the space between the two membranes.

6 Claims, 2 Drawing Figures

PATENTED JUL 11 1972 3,676,335

INVENTORS
ROBERT E. LACEY
MILTON S. MINTZ

BY Ernest S. Cohen
Roland H. Shubert
ATTORNEYS

PROCESS FOR EFFECTING CHANGES IN SOLUTION CONCENTRATIONS

This is a division of application Ser. No. 645,571 now U.S. Pat. No. 3,577,331 filed June 8, 1967.

BACKGROUND OF THE INVENTION

Processes designed to alter the concentrations of solutions by forcing a component of that solution to flow through a selectively permeable membrane to the exclusion of the remaining components have been well known for some time. These processes include: osmosis, dialysis, osmionosis, thermoosmosis, reverse osmosis, electro-osmosis, electrodialysis, transport depletion with cation-selective and near-neutral membranes, and electrosporation. These processes have been applied to a large number of solute-solvent separations and purifications, including use in artificial kidneys, the concentration of fruit juices, and the pasteurization of beer.

A recent upsurge in interest in membrane processes is traceable to public and private quests for methods designed to desalinate sea water and brackish waters. Among the candidate methods showing promise for extensive use in this area are transport depletion, electrodialysis, and reverse osmosis. These processes have the advantage over thermal desalination methods of not requiring a phase change. Furthermore, unlike the thermal processes, the driving forces required in the membrane processes are directly related to the degree of salinity of the water.

In the electrically driven processes, demineralization depends upon the formation of concentration gradients at the membrane-solution interfaces because of electrical current flowing through zones in which the ions have transference numbers that are different than their transference numbers in solution. These concentration gradients exist in boundary layer zones adjacent to the membrane surfaces. In these boundary layers the solution may be considered essentially static and ion transfer occurs only by electrical migration and diffusion.

It is the diffusion of electrolyte from the bulk of the solution, through the boundary layer, and toward the depleted membrane-solution interface that results in effective demineralization, and it is the corresponding diffusion of electrolyte from the concentrated membrane-solution interface toward the bulk solution that results in effective concentration.

If these boundary layers are relatively thick, the rate of electrolyte diffusion through them will be slow. A thick boundary layer of partially demineralized water (approaching zero concentration at the depleting membrane solution interface) also represents a high resistance path for the flow of current and causes high electrical energy demand for demineralization.

Attempts have been made, by increasing the electrical current, to transport solution ions through the membranes at a rate greater than the ions can diffuse through the boundary layers. Such attempts have proven futile because the hydrogen and hydroxyl ions present in the boundary layer solution carry the additional current. In practice, therefore, it is found that little additional demineralization or concentration of the original solution occurs.

Reverse osmosis is a pressure driven membrane process in which the flow of the classical osmosis experiment is reversed by an application of a pressure on the concentrated solution greater than the difference in osmotic pressure between the concentrated and permeate solutions.

In reverse osmosis, where solvent water is passed through a semipermeable membrane under the driving force of pressure but salt is rejected, a boundary layer of increased salt concentration is formed at the membrane-solution interface. 1/ (1/"-Salt Concentration at Phase Boundaries in Desalination Processes" Office of Saline Water Research and Development Progress Report No. 95.) The driving force necessary to demineralize the solution depends upon the salt concentration at the solution-membrane interface. A relatively thick boundary layer impedes the diffusion of salt back into the bulk solution from the membrane-solution interface and results in a high interfacial concentration. Thus, the driving force required to demineralize a solution of a given concentration is in part dependent upon the thickness of the boundary layer.

Hence, in both the electrically driven membrane processes and in reverse osmosis, it has been recognized that increased efficiencies can be realized by reducing the thickness of the membrane-solution boundary layers. Previous attempts to accomplish this end have involved either flowing the solutions through the cell compartments at high velocities parallel to the membrane surface, or placing flow-disturbing obstructions in the cell compartments, or both. While these methods do to some extent reduce the thickness of the boundary layer, they alone do not provide an adequate reduction. In addition, the benefits accruing from their use are offset, partially or entirely, by the considerable amount of pumping energy required by either procedure. Furthermore, the high fluid pressures demanded in these systems necessitate costly high-pressure sealing techniques to prevent both intercompartment and external leakage of solution which would not otherwise be necessary in the electrical processes.

Consequently, there remains a need in the art for an efficient means to reduce the thickness of the boundary layers present in all membrane separation processes and particularly in desalination systems where because of the high volumes of product needed, improvements in process efficiency become all important.

OBJECT OF THE INVENTION

Accordingly, the objects of the invention are:

To provide a method to reduce the thickness of boundary layers at solution-membrane interfaces in processes wherein the concentration of a solution is altered by passage of a component thereof through a semipermeable membrane.

To provide a method to reduce the thickness of boundary layers containing concentration gradients at the membrane-solution interfaces in desalination processes wherein water is desalinated by a separation of water and salt caused by the passage of one of those components through a semi-permeable membrane to the exclusion of the other.

To provide a method to reduce the thickness of the boundary layer formed at the membrane-solution interface in the process of reverse osmosis.

Still further objects and features of the present invention will become apparent from the following description of the invention.

DESCRIPTION OF THE INVENTION

Briefly, the present invention concerns an improved method and apparatus for use in effecting changes in solution concentrations wherein a component of the solution is passed through a selectively permeable membrane. The present improvement comprises positioning a second porous membrane close to the selectively permeable membrane and hydraulically flowing a portion of the feed solution through the porous membrane and toward the selective membrane.

Ion permeable films have previously been used to compartmentalize transport depletion cells. The use of such films has been fully described in Office of Saline Water Research and Development Progress Report No. 80 entitled, "Demineralization by Transport Depletion." Such films however have been designed so as to prevent hydraulic flow. Consequently they serve only as separators and do not in any way perform the function of the present invention.

The use of a porous asbestos diaphragm to compartmentalize an electrolysis cell has been disclosed by C. A. Butler, Jr., et al in U. S. Pat. No. 3,017,338. The porous diaphragm of that patent performs two functions. It separates the anode from the cation permselective membrane in a caustic producing electrolysis cell thereby forming a center chamber from which there is recovered a partially concentrated caustic solution and it serves to prevent the migration of negative hydroxyl ions produced in the central chamber back toward the positive anode where they would be converted into water and oxygen, the latter of which would cause corrosion problems. The problem central to the present invention, that is, the necessity of reducing the thickness of concentration boundary layers is not discussed in the Butler et al patent nor is there any indication that the problem could be solved through the use of a system such as the present invention.

A porous membrane in a demineralization cell is described by Kollsman in U. S. Pat. No. 3,309,301. In that system, an electrode causes ions to travel through two closely spaced membranes. The first membrane is of a type which allows the ions to pass through it in a hydrate form whereas the second membrane only allows passage of relatively unhydrated ions. The excess water of hydration is withdrawn from grooves formed by the partial contact of the two membranes. In the Kollsman system, there is no hydraulic flow other than that caused by the movement of hydrated ions and there is no recognition of the problem of a concentration boundary layer along the permselective membrane nor is there disclosed any configurations which would effect a reduction in thickness of a boundary layer.

The distinctions which the present invention enjoys over the prior art will be more clearly understood from the following description of some preferred embodiments wherein reference is made to the accompanying drawings in which:

FIG. 1 schematically illustrates the effect of the present invention in reducing the boundary layer when used in reverse osmosis;

FIG. 2 shows a cellular configuration incorporating the present invention for use in a reverse osmosis process.

In FIG. 1, there is shown the effect the present invention has on reducing the thickness of concentration boundary layers when used in reverse osmosis. In that figure, 100 is a reverse osmosis membrane, for example, cellulose acetate, and 101 is a non-selective porous membrane. Under conventional operation, a product having a concentration of solute of $C_p$ approaching zero is formed when water is selectively passed through a reverse osmosis membrane 100 by the application of a greater than osmotic pressure on a solution having a solute concentration of $C_s$. In the absence of the porous membrane 101, the exclusion of solute at the membrane-solution interface causes a concentration gradient $G_5$ to form on the solution side of the membrane within the boundary layer enclosed by line $B_1$, that is formed by the usual hydrodynamic forces applied in conventional operation. The thickness of the boundary layer in conventional operation (without the use of the present invention) is pictured as $D_4$. The concentration of solute $C_1$ at the membrane-solution interface is determined by two parameters; the thickness of the boundary layer, $D_4$, and the driving force exerted, in terms of pressure, on the solution. The slope of the concentration gradient $G_5$ is determined by the rate of diffusion of ions from the face of the membrane to the bulk of the feed solution. As can be seen, a thick boundary layer, starting at $B_1$, results in a high concentration of solute $C_1$ at the membrane surface. Since the driving force required is dependent upon the concentration of solute at the membrane-solution interface, it can be seen that the result of a thick boundary layer is a high energy requirement.

If a porous membrane 101 is positioned at a distance $D_6$ from member 100 and feed solution flows through membrane 101 and is withdrawn from the space between the two membranes, 100 and 101, the concentration gradient is shifted to a new location, $G_6$. In effect a thinner boundary layer is created starting at $B_2$ and represented by width $D_5$.

With a thinner boundary layer, $D_5$, a lower concentration of solute $C_2$, is present at the membrane surface and the result is a lowering of the energy requirements of the system. With conventional reverse osmosis operating without porous membrane 101, the driving force must exceed the osmotic pressure of a solution having a solute concentration of $C_1$. With solution flowing through a porous membrane 101, and the membrane-solution solute concentration reduced to $C_2$, the driving force need only exceed the osmotic pressure of a solution having a solute concentration of $C_2$.

It can be seen that, Y, the difference between $C_s$ and $C_2$ is dependent upon distance $D_5$. The spacing $D_6$ between the selective membrane 101 should be as small as it can be made and still provide for adequate withdrawal of the solution that flows through membrane 101. Generally, spacing $D_6$ will be in the range of about 0.001 to 0.050 inches.

FIG. 2 illustrates a reverse osmosis system incorporating the present invention. The solution 200 to be demineralized is pressured and introduced into a cell similar to those used in conventional reverse osmosis, and the solution flows to the top surface of a porous membrane 201 that is positioned the desired distance from the selective side of a reverse osmosis membrane 203 by a net or mesh spacer 202. The spacer material may be a net or screen-like material which provides a multiplicity of support locations for membranes 201 and 203, and which is the desired thickness and which allows solution flow parallel to membranes 201 and 203. An example of a suitable material is a thin net of polyethylene.

Porous membrane 201 may comprise a felted mat of fibrous materials such as paper, polyethylene, polypropylene, Dynel, Acrilan, or Nylon; it may consist of porous plastic film such as thin sheets of open-cell polyurethane foam; or cellulosic films and parchment. The material out of which the porous membrane is made is not critical. However, the material must have the ability to pass solution fluxes of from about 10 to 650 ml per minute per square inch of membrane surface under a hydraulic pressure drop of about 2 inches of water.

The reverse osmosis membrane 203 rests on and is supported by a member support 204 of the type used in conventional reverse osmosis. Slots 208 at one edge of the net spacer 202 (or part way around the perimeter of a circular cell) interconnected with withdrawal ducts 206 so that the feed solution flows through the porous membrane 201 toward the reverse osmosis membrane 203 and then through the solution channel formed by the net spacer 202 and the two membranes 201 and 203 to the slots at the edges of the cell 208 and is withdrawn through the ducts 206. This solution may be recycled and mixed with fresh feed (via 209) or it may be discarded to a waste stream through a pressure reducing valve 210. The demineralized water 211 that is transferred through the reverse osmosis membrane 203 goes through the membrane support 204 and is withdrawn through conventional means 207 of enclosing and withdrawing the product.

As well as being useful in all membrane separation processes, the present invention may be used with a large combination of solutes and solvents. Particular utility of this invention is found in processes designed to desalinate sea water or brackish waters.

What is claimed is:

1. A process for altering the concentration of a feed solution by reverse osmosis to produce a less concentrated permeate solution and a more concentrated waste solution which comprises:
    a. positioning a first membrane, which is substantially permeable to the feed solution, in a substantially parallel relationship to a second reverse osmosis membrane, said first membrane spaced at a distance of from 0.001 to 0.050 inches from said second membrane;
    b. passing said feed solution through the first membrane under an applied pressure greater than the osmotic pressure developed between the feed solution and the permeate solution, said feed solution being unchanged in concentration by passage through said first membrane;
    c. withdrawing a portion of said feed solution from the space between said first and second membranes, and
    d. recovering a permeate solution which passes through the reverse osmosis membrane.

2. The process of claim 1 wherein said feed solution is chosen from the group consisting of sea water and brackish water.

3. The process of claim 2 wherein said first membrane comprises a felted mat of a fibrous material.

4. The process of claim 3 wherein at least a portion of the feed solution withdrawn from the space between said first and second membranes is recycled back to the entering feed solution stream.

5. The process of claim 4 wherein the permeate solution comprises water.

6. The process of claim 5 wherein said reverse osmosis membrane comprises cellulose acetate.

* * * * *